Patented Dec. 10, 1929

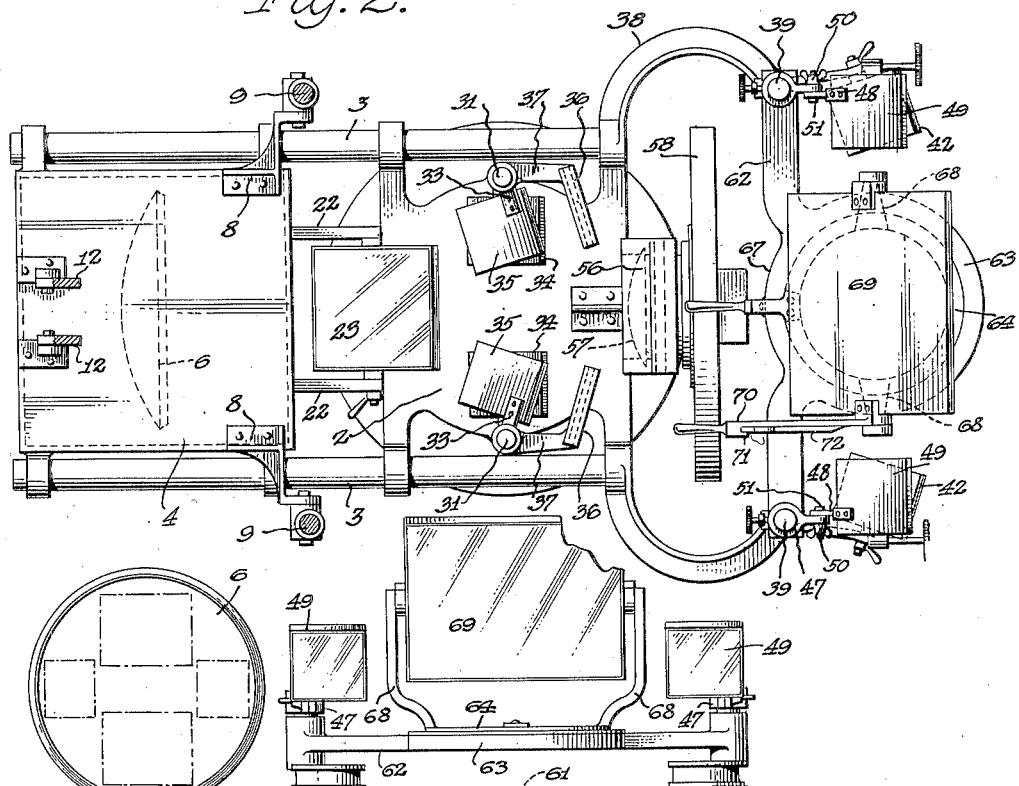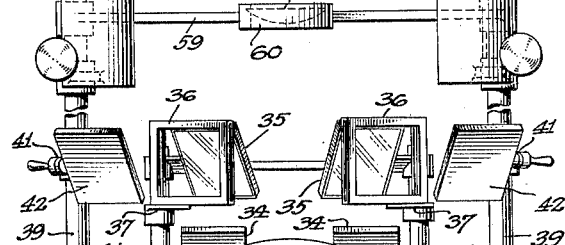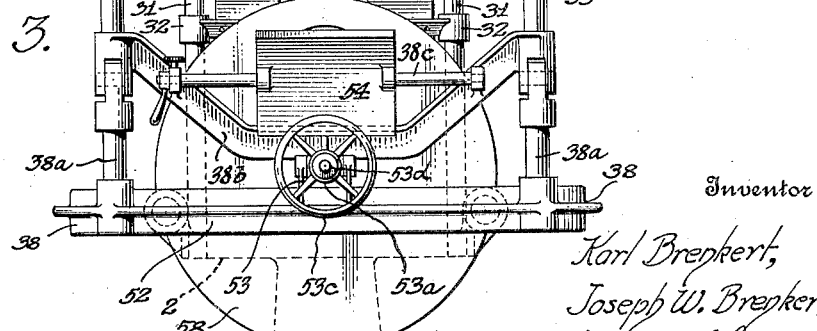

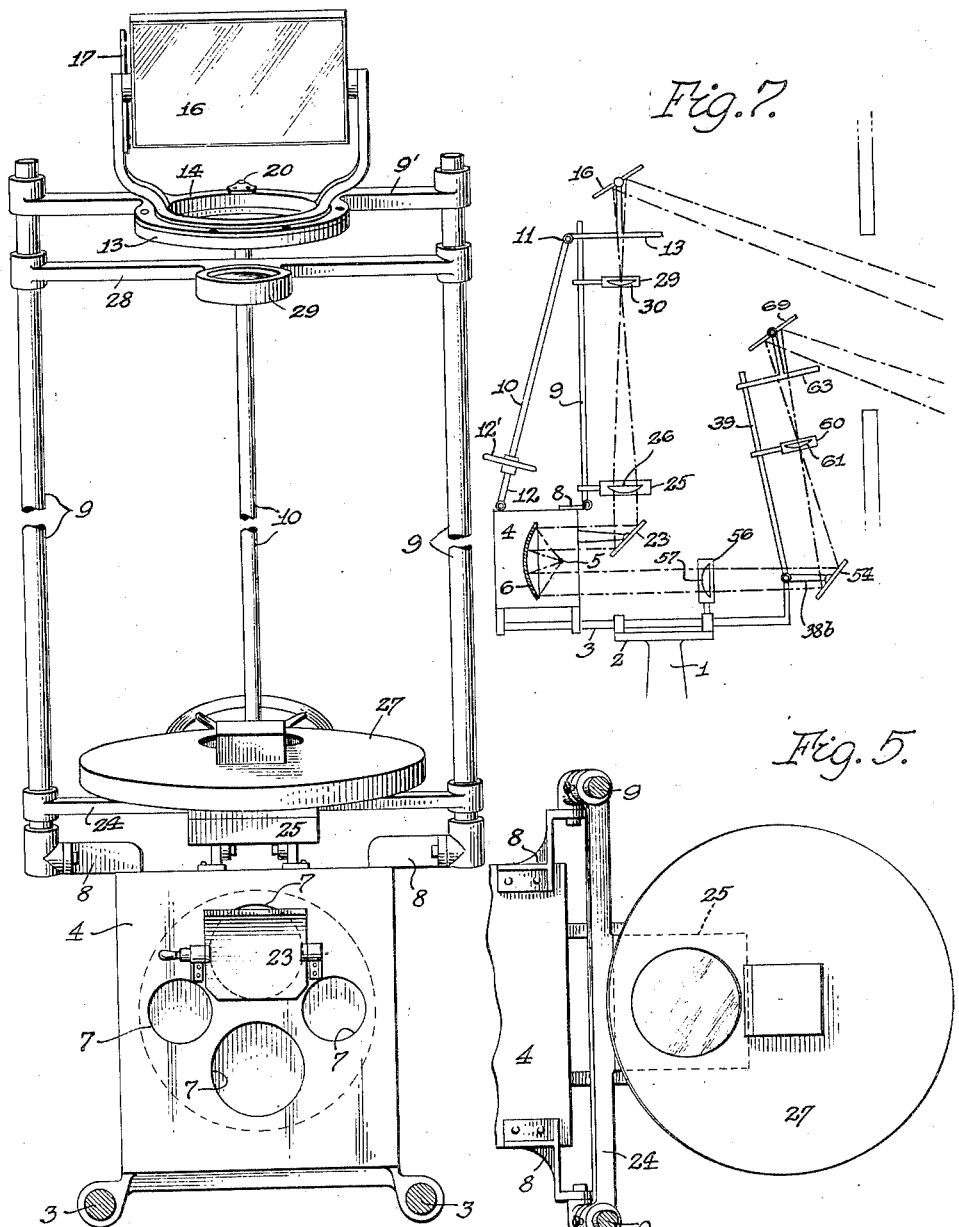

1,738,942

UNITED STATES PATENT OFFICE

KARL BRENKERT AND JOSEPH W. BRENKERT, OF DETROIT, MICHIGAN

PROJECTION APPARATUS

Application filed April 9, 1928. Serial No. 268,663.

The present invention pertains to a novel projection apparatus constructed for use in theatres, auditoriums and the like.

The principal object of the invention is the provision of a device of this character whereby it will be possible to project stereopticons and effects, separately or simultaneously from a single source of light. This source is of the same amperage as each of the lamps in a two unit machine, but the initial reflector at the source is made of such size and curvature that it throws an original beam which may be divided into at least four parts which are finally transmitted to projecting reflectors directed towards the screen or stage.

We preferably employ in this construction a mirror fourteen inches in diameter having a utilized reflecting area of about one hundred fourteen square inches after the beam has been divided. The deflecting power or efficiency of this mirror is nearly six times that of the regular mirror five inches in diameter. Allowing for the fact that present machines require twice as much current as the new machine, the latter is considerably more efficient than the old type.

In order that the finely projected rays shall not interfere with one another, the projecting reflectors for stereopticons are placed outside the path of the original beam, and suitable reflector systems are provided for transferring the intercepted light to the stereopticon projecting mirrors. The stereopticon holders are placed in the system after the light from the source has been reflected by two mirrors, and as a result of this particular arrangement of the slides, the intensity of the light is reduced sufficiently to avoid burning the slides. More specifically, the current at the light source is sixty amperes and is reduced by ten per cent at each mirror. The light is reflected by two mirrors before reaching the slide and is reduced to an intensity corresponding to thirty-nine amperes, which is not sufficient to burn the slides.

Other advantages and features of the invention will appear as the description proceeds.

The invention is fully disclosed by way of example in the following description and in the accompanying drawings, in which—

Fig. 2 is a plan section on the line 2—2 of Figure 1;

Fig. 3 is a front elevation of the device;

Fig. 4 is a vertical transverse section;

Fig. 5 is a section on the line 5—5 of Figure 1;

Fig. 6 is an elevation of the reflector at the light source, showing diagrammatically the manner in which the beam is divided; and Fig. 7 is a side elevation of the device.

Reference to these views will now be made by use of like characters which are employed to designate corresponding parts throughout.

Figure 1:
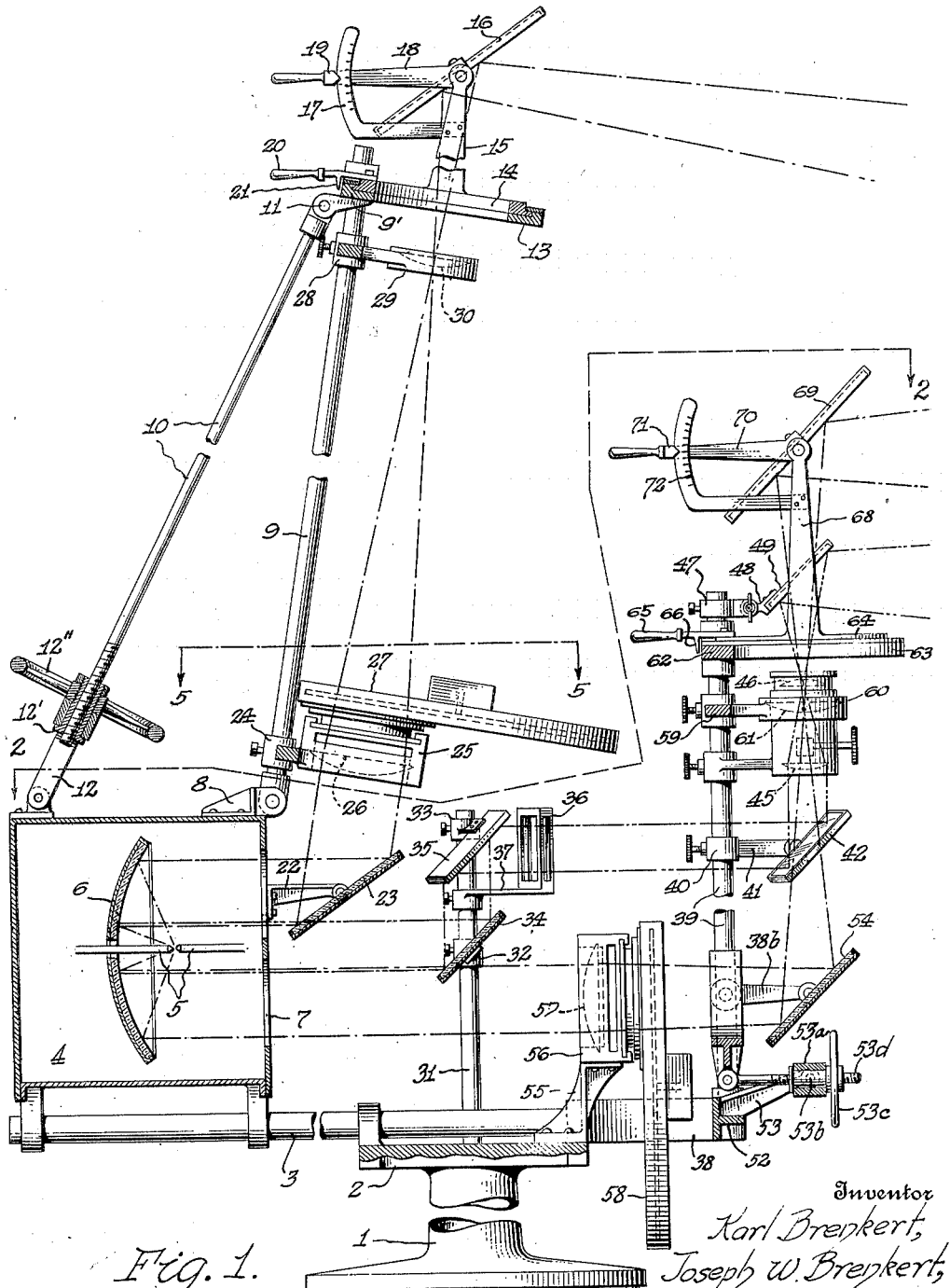
Figure 1 is a vertical longitudinal section of the device.

The device is built upon a base 1 having a table top 2 across which are supported a pair of parallel horizontal rods 3. At one side of the table, the rods support a housing 4 in which is mounted a light source consisting of a pair of carbon electrodes 5 behind which is a concave reflector 6. In front of the light source the forward wall of the housing 4 is formed with apertures 7 to permit passage of divisions of the beam produced by the light source.

At the forward upper edge of the housing 4 are secured brackets 8 to which are pivoted posts 9 joined at their upper ends by a cross bar 9'. The posts are maintained at the desired inclination, for a purpose presently to be described, by means of a guy rod 10 having its upper end pivotally attached to a bracket 11 on the cross bar 9' and its lower end threaded. On the top of the housing 4 is pivoted a yoke 12 having a sleeve 12' rotatably and non-slidably mounted therein. The lower end of the rod 10 is threaded into the sleeve 12' which also carries a hand wheel 12" for changing the angle of the rod 10 and posts 9. On the bar 9' is secured a ring 13 in which is rotatably mounted another ring 14 formed with a pair of forwardly extending arms 15. Between the arms is mounted a projecting reflector 16 having a rotatable support so that it may be set at various angles of inclination. A scale member 17 is secured to one of the arms 15 and cooperates with a handle 18 adapted to turn the reflector 16, the handle having a pointer 19 riding adjacent the scale to aid in the setting of the reflector at the desired angle. The inner ring 14 may be rotated by a handle 20 fixed thereto and having a pointer 21 cooperating with a suitable scale formed on the member 13. By virtue of these two rotary supports of the reflector 16, the latter has a universal adjustment.

To the forward wall of the housing 4 is secured a bracket 22 which pivotally supports a primary reflector 23 directed towards the projecting reflector 16. The rod 9 carries near its lower end an adjustable sleeve 24 supporting a holder 25 which carries a condensing lens 26 and an effect producing device 27 of a type already known in the art and illustrated for example in catalogue K of Universal Electric Stage Lighting Company, 321–325 W. 50th Street, New York, copyright 1922 by Kliegl Bros., pages 44, 45 and 47. A slidable bar 28 across the upper ends of the posts 9 carries a frame 29 which supports a focusing lens 30. The position of the mirror 23 is such that it receives a division of the beam and projects it through the condensing and focusing lenses into the projecting reflector 16.

On the top 2 are mounted a pair of vertical posts 31 lying adjacent the horizontal rods 3 as may be seen by comparison of Figures 1 and 2. The assemblies on both rods are alike and only one of them need be described.

Lower and upper sleeves 32 and 33 are adjustably mounted on the rod, the former carrying a primary mirror 34 adapted to intercept a lateral portion of the original beam. The upper sleeve 33 carries a similar reflector 35 adapted to receive light from the member 34 and retransmit it in parallel relation to the original path. The reflector 35 projects through a stereopticon slide holder positioned in front of it and suitably supported by a bracket 37 secured to the post 31.

The forward edge of the table top 2 is formed with a pair of outwardly bowed arms 38 supporting a pair of legs 38$^a$ spaced outwardly from the original beam in order not to interfere with it. On the legs is pivotally mounted a yoke 38$^b$ having posts 39 inserted in the ends thereof. Each post carries a slidable arm 40 to which is slidably attached a bracket 41 pivotally supporting a secondary reflector 42 positioned to receive light from the holder 36. Each post also supports a condensing lens 45 and focusing lens 46 in line with the reflector 42 thereon, and at the upper end is a slidable ring 47 having a bracket 48 hinged thereto for supporting a projecting reflector 49 in line with the condensing and focusing lenses and directed towards the same general area as that illuminated by the member 16. The adjustment between the parts 47 and 48 is secured by a wing nut 50 threaded on the pivot pin 51.

In the stereopticon systems, the light is reflected by the members 34 and 35 before reaching the lantern slide. The usual amperage at the light source 5 is sixty and is reduced ten per cent at each reflector. Consequently the intensity of the light reaching the lantern slide corresponds to an amperage of thirty-nine which is insufficient to burn the slide. Although sixty amperes are desirable for the projection of effects, this value is reduced by means of reflectors 34 and 35 to a point where it does not injure the slides.

The forward ends of the arms 38 are joined by a rail 52 carrying a pair of spaced central brackets 53 between which is mounted a swiveled boss 53$^a$. A sleeve 53$^b$ with a hand wheel 53$^c$ rotates non-slidably in the boss and is threaded upon a screw 53$^d$ which is fixed to the yoke 38$^b$. By this means the angularity of the posts 39 is adjusted similarly to the posts 9 for setting the projecting mirrors carried thereby to the most efficient incline for projection purposes.

The yoke 38$^b$ carries rotatable and adjustable trunnions 38$^c$ which support another primary mirror 54 adapted to receive a fourth division of the beam emanating from the light source. At the forward edge of the top 2 is mounted a bracket 55 carrying a holder 56, containing a condensing lens 57 and constructed to support an effect producing device 58. The members 57 and 58 intercept the beam division which enters the primary mirror 54. The posts 39 are joined near their upper ends by another rail 59 on which is slidably mounted a frame 60 carrying a focusing lens 61 positioned to be penetrated by the beam reflected from the mirror 54. Another rail 62 joining the upper extremities of the posts 39 is formed with a central ring 63 in which is rotatably mounted another ring 64 from which extends a handle 65 provided with a pointer 66 cooperating with an arcuate formation 67 on the member 62. A pair of uprights 68 are formed at diametrically opposite points on the ring 64 and have a projecting reflector 69 journaled between them and directed towards the same general area which receives light from the projecting reflectors 16 and 49. To one edge of the reflector 69 is secured an operating handle 70 formed with a pointer 71 which cooperates with a scale member 72 extending from one of the uprights 68.

It will be seen in Figure 1 that the effect projecting devices 16 and 69 are in alignment longitudinally of the machine but positioned one above the other so that the beam from the upper member will not be obstructed by the lower member. The adjustable inclination of the posts 9 brings the member 16 near to the port of the projecting housing so that this port may receive the beam before the cross sectional area of the latter becomes too large. Also, the direction of these projecting reflectors is adjustable by the universal mountings already described.

The secondary reflectors 42 and the projecting reflectors 49 of the stereopticon systems are spaced laterally of the original beam in order not to interfere with the original beam division passing to the foremost primary reflector 54 for effect purposes. The reflectors 35 and 42 are suitably inclined, as shown in Figures 1, 2 and 3 to produce such lateral deflection of the corresponding beam divison. Dissolving shutters may be associated with the stereopticon sets to effect alternate projection therefrom on a given area, while the two effect systems may be directed simultaneously to the top and bottom or to both sides, or opposed upon, the stereopticon projection on the screen.

Figure 7 illustrates diagrammatically an adjustment of the apparatus wherein the posts 9 are vertical and the posts 39 inclined rearwardly. These positions of the posts bring the projecting mirrors 16 and 69 to inclinations not exceeding 45° to the horizontal. The projecting mirrors are thus retained in positions more favorable to the efficient projection of light therefrom. Due to the pivotal mounting of the posts 9 and 39, these mirrors may be spaced as desired from the projection port in accordance with special conditions and requirements, and in any case the pivoted mirrors 23, 42 and 54 are adjusted for reflection into the projection mirrors.

It will be apparent that we have provided a machine capable of producing stereopticon and effect projections from a single source of light in accordance with the primary object of the invention as previously stated.

What we claim is:—

1. In a projector, a light source, projecting reflectors adapted for direction towards a common general area, primary reflectors adapted to divide a beam issued from said source, one of said primary reflectors being directed towards one of the projecting reflectors, means for supporting an effect device between the last named primary and projecting reflectors, a secondary reflector directed towards the other projecting reflector, the remaining primary reflector being directed towards said secondary reflector, and means for supporting a stereopticon slide in the path of the beam division entering the remaining projecting reflector.

2. In a projector, a light source, projecting reflectors adapted for direction towards a common general area, primary reflectors adapted to divide a beam issued from said source, one of said primary reflectors being directed towards one of the projecting reflectors, means for supporting an effect device between the last named primary and projecting reflectors, a secondary reflector directed towards the other projecting reflector, the remaining primary reflector being directed towards said secondary reflector, and means for supportng a stereopticon slide between the secondary reflector and the primary reflector directed thereagainst.

3. In a projector, a light source, pairs of projecting reflectors adapted for direction towards a common general area, pairs of primary reflectors adapted to divide a beam issuing from said source, one of said pairs of primary reflectors being directed towards one of the pairs of projecting reflectors, means for supporting an effect device between each of the last named primary reflectors and the projection reflectors corresponding thereto, a pair of secondary reflectors directed towards the other pair of projecting reflectors, the remaining primary reflectors being directed towards said secondary reflectors, and means for supporting stereopticon slides in the paths of the beam divisions entering the remaining projecting reflectors.

4. In a projector, a light source, pairs of projecting reflectors adapted for direction towards a common general area, pairs of primary reflectors adapted to divide a beam issuing from said source, one of said pairs of primary reflectors being directed towards one of the pairs of projecting reflectors, means for supporting an effect device between each of the last named primary reflectors and the projection reflectors corresponding thereto, a pair of secondary reflectors directed towards the other pair of projecting reflectors, the remaining primary reflectors being directed towards said secondary reflectors, and means for supporting stereopticon slides between each of the secondary reflectors and the primary reflector directed thereagainst.

5. In a projector, a light source, a pair of primary reflectors arranged in the path of the beam issuing from said source and adapted to form converging beam divisions, projecting reflectors in the path of said divisions and directed towards a common general area, another projecting reflector directed towards the same area, another primary reflector disposed in the path of the beam and adapted to further divide the same, a secondary reflector directed towards the last named projecting reflector, said last named primary reflector being directed toward said secondary reflector, means for supporting an effect device between each of the first named primary reflectors and the corresponding projecting reflector, and means for supporting a stereopticon slide between the remaining primary reflector and the secondary reflector.

In testimony whereof we affix our signatures.

KARL BRENKERT.
JOSEPH W. BRENKERT.